United States Patent
Lee et al.

(10) Patent No.: US 10,375,331 B2
(45) Date of Patent: Aug. 6, 2019

(54) IMAGE PROCESSING DEVICE AND NOISE REDUCTION SYSTEM HAVING THE SAME

(71) Applicant: SAMSUNG ELECTRONICS CO., LTD., Suwon-si (KR)

(72) Inventors: Jonghwa Lee, Gwangmyeong-si (KR); Nyeong-Kyu Kwon, Daejeon (KR); Woonghee Lee, Seoul (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 84 days.

(21) Appl. No.: 15/067,590

(22) Filed: Mar. 11, 2016

(65) Prior Publication Data
US 2016/0277694 A1    Sep. 22, 2016

(30) Foreign Application Priority Data
Mar. 18, 2015    (KR) ........................ 10-2015-0037512

(51) Int. Cl.
G06T 5/00    (2006.01)
H04N 5/367    (2011.01)

(52) U.S. Cl.
CPC ........... *H04N 5/3675* (2013.01); *H04N 5/367* (2013.01); *G06T 5/002* (2013.01)

(58) Field of Classification Search
CPC .. H04N 5/2171; H04N 5/2176; H04N 5/2178; H04N 5/357–3675; H04N 1/4097; H04N 5/3675; H04N 5/367; G06T 5/002; G06T 5/005; G06T 2207/20216; G06K 9/40; G06K 9/44
See application file for complete search history.

(56) References Cited

U.S. PATENT DOCUMENTS

| | | | |
|---|---|---|---|
| 8,164,661 B2 | 4/2012 | Park et al. | |
| 8,259,198 B2 | 9/2012 | Cote et al. | |
| 2004/0096125 A1* | 5/2004 | Alderson | H04N 5/367 382/312 |
| 2006/0017826 A1* | 1/2006 | Sekimoto | A61B 1/041 348/246 |
| 2010/0013964 A1 | 1/2010 | Negishi | |
| 2011/0069904 A1* | 3/2011 | Yang | G06T 5/002 382/275 |
| 2013/0329098 A1 | 12/2013 | Lim et al. | |
| 2014/0192236 A1* | 7/2014 | Kolli | H04N 5/3675 348/246 |
| 2014/0347528 A1* | 11/2014 | Tachi | G06T 3/4015 348/242 |
| 2015/0156484 A1* | 6/2015 | Takahama | G06K 9/6202 348/187 |

(Continued)

FOREIGN PATENT DOCUMENTS

| | | |
|---|---|---|
| KR | 1020060077164 | 7/2006 |
| KR | 1020090026449 | 3/2009 |
| KR | 1020090061927 | 6/2009 |

*Primary Examiner* — Gevell V Selby
(74) *Attorney, Agent, or Firm* — F. Chau & Associates, LLC

(57) ABSTRACT

An image processing device includes a bad pixel masking unit and a noise reduction unit. The bad pixel masking unit detects bad pixels in a plurality of blocks and masks the determined bad pixels. The noise reduction unit removes noise from the pixels in the plurality of blocks excluding the masked pixels using a pattern matching method and corrects bad pixels by obtained an average pixel value.

16 Claims, 7 Drawing Sheets

(56) References Cited

U.S. PATENT DOCUMENTS

2015/0381913 A1* 12/2015 Honda .................. H04N 5/367
                                                    348/246
2017/0026597 A1* 1/2017 Cao ....................... H04N 5/367

* cited by examiner (a)  (b)  (c)

IMAGE PROCESSING DEVICE AND NOISE REDUCTION SYSTEM HAVING THE SAME

CROSS-REFERENCE TO RELATED APPLICATION

This application claims priority under 35 U.S.C. § 119 to Korean Patent Application No. 10-2015-0037512 filed on Mar. 18, 2015, the disclosure of which is incorporated by reference in its entirety herein.

BACKGROUND

Technical Field

Example embodiments of the inventive concept relate to an image processing device, and more particularly, to an image processing device and a noise reduction system including the same.

Discussion of Related Art

Image recording devices use digital image sensors. For example, an image sensor is a device that detects and conveys information that constitutes an image. Examples of digital image sensors include semiconductor charge-coupled devices (CCD) and active pixel sensors in a complementary metal-oxide-semiconductor (CMOS). However, the image signals output by digital image sensors may include noise. Accordingly, there is a need for a technology that can reduce noise in an image processing device.

SUMMARY

At least one embodiment of the inventive concept provides an image processing device and noise reduction system including a noise reduction unit.

According to an exemplary embodiment of the inventive concept, an image processing device includes a first processor and a second processor. The first processor detects bad pixels in a plurality of blocks and masks the determined bad pixels. Each block includes a plurality of pixels. The second processor removes noise from the pixels in the plurality of blocks excluding the masked pixels using a pattern matching method and corrects bad pixels by obtaining an average pixel value.

In an embodiment, the first processor determines whether one of the pixels in one of the blocks is a bad pixel or not by calculating the average pixel value of at least one other pixel in the one block excluding the one pixel and comparing the calculated average pixel value with a pixel value of the one pixel.

In an embodiment, the first processor stores masking data for the one pixel when the one pixel is determined to be the bad pixel, where the masking data includes position data of the one pixel.

In an embodiment, the pattern matching method selects a correction target block and a comparison target block from the plurality of blocks, and compares a similarity between the plurality of pixels included in the correction target block and the comparison target block, and the masked pixels are excluded from the comparison.

In an embodiment, the second processor sums up absolute values of differences between the pixels included in each of the correction target block and the comparison target block to generate a summed value and calculates a value of the similarity based on the summed value.

In an embodiment, the second processor assigns a weight according to the value of the similarity and the masked pixels are excluded from the assignment of the weight.

In an embodiment, the second processor provides an average value of values as a compensation value of the correction target block, where the values are generated from multiplying a pixel value for each pixel of the comparison target block by the weight.

According to an exemplary embodiment of the inventive concept, an application processor (AP) includes an image processing device which performs a noise reduction method on a plurality of pixels excluding the pixels determined to be bad pixels and a memory controller which controls the image processing device. The image processing device includes an input device which receives input pixel values from the pixels, a first processor which determines from the input pixel values whether the pixels are bad pixels or not and masks the determined bad pixels, a second processor which receives masking data from the first processor indicating the masked pixels, compares a similarity with respect to blocks of the pixels excluding the masked pixels, and corrects the masked pixels when the noise reduction operation is performed on one of the blocks to generate compensated pixels values, and an output device which outputs the compensated pixel values.

In an embodiment, the first processor stores position data of the bad pixels in the masking data.

In an embodiment, the first processor determines whether one of the pixels in one of the blocks is a bad pixel or not by calculating an average pixel value of at least one other pixel in the one block excluding the one pixel.

In an embodiment, the first processor sets a threshold value, determines a range from threshold value and the average pixel value, and determines the one pixel as the bad pixel when a pixel value of the one pixel is outside the range.

In an embodiment, the first processor further includes a look up table which stores position data of the bad pixels in the masking data.

In an embodiment, the second processor uses a pattern matching method as the noise reduction method.

In an embodiment, the second processor is configured to select a first block and a second block among the blocks and compare a similarity between the two blocks excluding pixels of the two blocks determined to be the bad pixels, assign a weight to the second block according to a result of the compare, and calculate an average value using the weight and a pixel value of each pixel of the second block.

In an embodiment, the second processor sets the average value of the second block as a corrected value of the first block and includes the bad pixels excluded from the first block.

In an embodiment, the second processor sums up absolute values of differences between the pixels included in each of the first block and the second block to generate a summed value and calculates a value of the similarity based on the summed value.

In an embodiment, the second processor excludes the assignment of the weight to each bad pixel when a weight is assigned according to a value of the similarity.

According to an exemplary embodiment of the inventive concept, a noise reduction system includes an image sensor which converts an optical image into digital signals, an application processor (AP) including an image processing device which processes the digital signals converted by the image sensor, and a display panel which displays the digital signals processed by the AP. The image processing device includes an image input unit (e.g., an input device) which receives external image pixels values, a bad pixel masking unit (e.g., a first processor) which determines whether pixels of the image input unit are bad pixels or not and masks the determined bad pixels, a noise reduction unit (e.g., a second processor) which receives masking data from the bad pixel masking unit, compares a similarity with respect to each of remaining pixels excluding the bad pixels in target blocks, and performs a noise reduction method on the corresponding blocks, and an image output unit (e.g., an output device) which outputs pixel values processed by the noise reduction unit.

In an embodiment, during the reduction of noise by the image processing device, when a correction target block and a comparison target block are selected and a pattern matching method is performed, the bad pixels included in the correction target block are marked to exclude the bad pixels from the comparison, and the pattern matching method is performed on remaining pixels In an embodiment, the image processing device performs the comparison based on a weight averaging method.

According to an exemplary embodiment of the inventive concept, an image processing device includes a digital image sensor comprising a plurality of pixels and an application processor. The application processor is configured to detect bad pixels within a first pixel block having a first set of the pixels and a second pixel block having a second set of the pixels, compare pixel values of the pixels of the first pixel block not detected to be bad pixels with pixel values of the pixels of the second pixel block not detected to be bad pixels to generate a similarity metric, correct the bad pixels included in the first pixel block and perform a noise reduction operation on the pixel values of the first pixel block using the similarity metric.

In an embodiment, the application processor sums up absolute values of differences between the pixels values of the pixels included in each of the two blocks to generate the similarity metric.

In an embodiment, the application processor assigns a weight according to the similarity metric, wherein the bad pixels are excluded from the assignment of the weight.

In an embodiment, the application processor generates an average value of values as a compensation value of the first pixel block, where the values are generated from multiplying a pixel value for each pixel of second block by the weight.

In an embodiment, the application processor determines whether one of the pixels in one of the blocks is a bad pixel or not by calculating an average pixel value of at least one other pixel in the one block excluding the one pixel and comparing the calculated average pixel value with a pixel value of the one pixel.

BRIEF DESCRIPTION OF THE DRAWINGS

The present inventive concept will become more apparent by describing in detail exemplary embodiments thereof with reference to the accompanying drawings, in which.

DETAILED DESCRIPTION OF THE EXEMPLARY EMBODIMENTS

Figure 1:
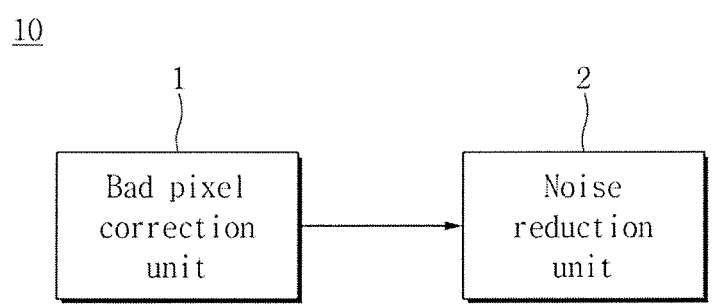
FIG. 1 is a block diagram of an image processing device.

Hereinafter, exemplary embodiments of the inventive concept will be described in detail with reference to the accompanying drawings. While the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept.

It will be understood that when an element is referred to as being "connected" or "coupled" to another element, it can be directly connected or coupled to the other element or intervening elements may be present.

As used herein, the singular forms "a," "an," and "the" are intended to include the plural forms as well, unless the context clearly indicates otherwise.

Meanwhile, when an embodiment can be implemented differently, functions or operations described in a particular block may occur in a different way from a flow described in the flowchart. For example, two consecutive blocks may be performed simultaneously, or the blocks may be performed in reverse according to related functions or operations.

Hereinafter, exemplary embodiments of the inventive concept will be described with reference to the accompanying drawings.

FIG. 1 illustrates a block diagram of an image processing device 10.

Referring to FIG. 1, the image processing device 10 includes a bad pixel correction unit 1 and a noise reduction unit 2.

The bad pixel correction unit 1 determines positions of bad pixels and generates a compensation signal when image signals corresponding to the bad pixels are received. The bad pixel correction unit 1 may compensate for a value of each bad pixel according to the compensation signal using position data of the bad pixel.

A bad pixel is a pixel in a digital image sensor that responds to light in a manner that differs from a normal pixel, and accordingly produces a result that differs from the normal pixel. Bad pixels may be generated in a digital image sensor during an image sensor manufacturing process used to manufacture the digital image sensor. Examples of bad pixels include a white bad pixel, a black bad pixel and a response bad pixel.

Bad pixels degrade the accuracy of an image sensor even when only a few bad pixels are present among millions of pixels. Accordingly, a technique for determining the bad pixels and compensating for the bad pixels through signal processing may be required.

For example, an interpolation method may be performed using a look up table in order to correct the bad pixels.

A nearest neighbor interpolation method, a bilinear interpolation method, a median interpolation method, or a brute-force interpolation method may be used as a bad pixel processing method.

The noise reduction unit 2 completes the image processing using a noise reduction technique in a state in which the bad pixels are corrected. The images processed using the noise reduction technique will be described with reference to the following drawing.

Figure 2:
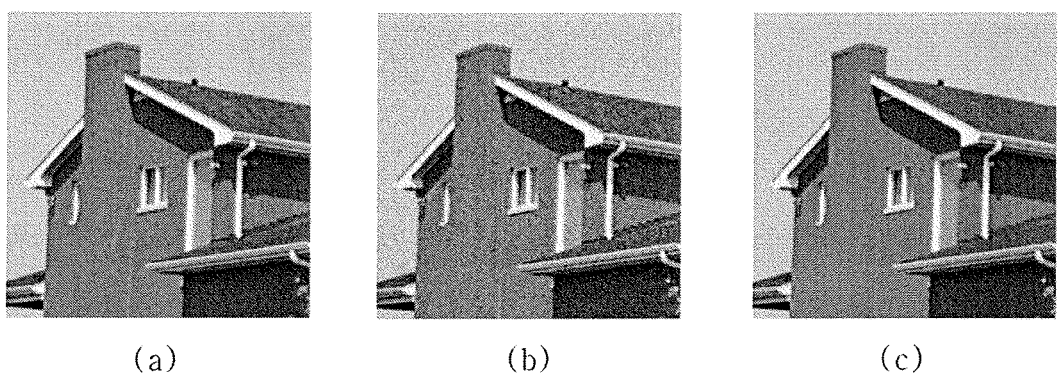
FIG. 2 is a view showing various output images of an image.

FIG. 2 is a view showing various output images with respect to an image.

Referring to FIG. 2, part (a) shows an original image, part (b) shows an image in which noise is generated, and part (c) shows an image in which the noise is removed.

Part (a) of FIG. 2 may illustrate a clean image without noise, which is received from the image transmission side.

Part (b) of FIG. 2 may illustrate an image in which noise is added into the image and thus edges of the image are unclear and background or a main part of the image is also unclear. The noise, which is generated in various forms, may include Gaussian noise, speckle noise, and the like.

As shown in part (c) of FIG. 2, when the noise reduction technique is used, the edges of the image become clearer and the clarity of the background or the main part of the image becomes similar to the original image shown in part (a) of FIG. 2.

The noise reduction technique may be divided into an averaging method and a non-local means (hereinafter, refers to 'NL means') method that is based on a block of pixels.

The averaging method is a method in which the noise is removed by averaging data values of the pixels. The NL means method is a pattern matching and comparing method based on the block.

Figure 3A:
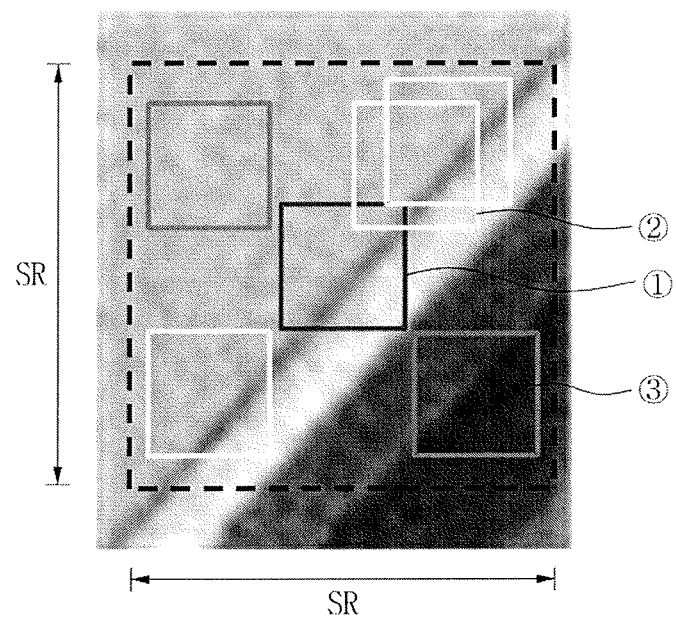
FIG. 3A is a view showing an example of an image to which a non-local (NL) means method is applied.

FIG. 3A is a view showing an example of an image to which the NL means method is applied.

Referring to FIG. 3A, a predetermined number of pixel groups, that is, blocks, are set in a search range (SR) and the similarity (e.g., a similarity metric) between the blocks is estimated to correct the image.

The above method can be used because the noise is estimated to be removed under an assumption that the corresponding block of the image would be repeated in a similar form in surrounding regions.

When a block ① is a pixel block in which noise is generated, the method may include comparing the block ① and the other blocks to determine whether a similarity therebetween exists or not in the SR, and assigning a weight to the blocks. Thus, the block that is most similar to the block ① may be a block ② rather than a block ③, and accordingly a weight higher than that of the block ③ is assigned to the block ②.

The NL means method uses a weight averaging method in which weights are assigned according to the similarity between the surrounding regions using the entire image data in the SR to sum the weights. Therefore, the noise of the image sensor may be effectively removed.

The weights are assigned according to the similarity between the pixel groups, that is, the blocks, and in an exemplary embodiment, the similarity is 'a difference' between pixels included in a block. When the difference between the pixels is represented as 'a sum of absolute difference' (hereinafter, referred to as 'SAD'), the SAD is decreased as the similarity is increased. For example, a SAD value for block ② would be lower than a SAD value for block ③, when block ② is more similar than block ③.

Figure 3B:
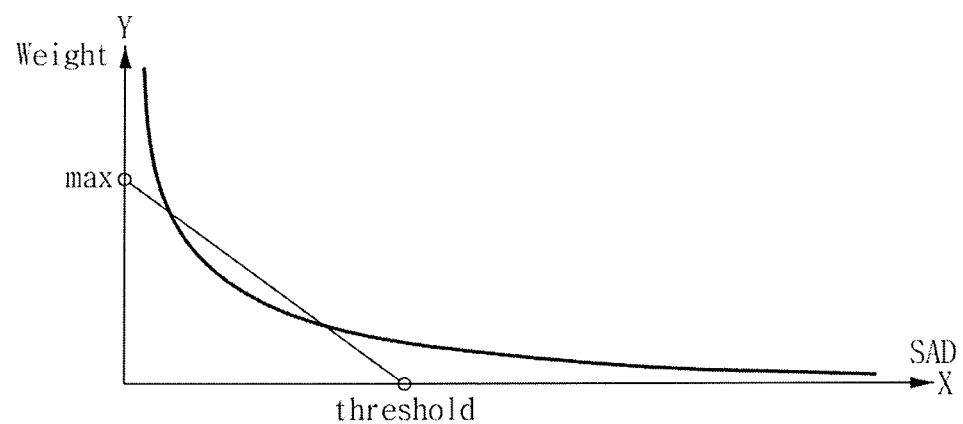
FIG. 3B is a graph showing a relationship between a weight and a sum of absolute difference (SAD)

FIG. 3B is a graph showing a relationship between a weight and a SAD.

Referring to FIG. 3B, a change of the SAD according to the similarity between the blocks may be seen.

An X-axis in the graph of FIG. 3B represents the SAD and a Y-axis represents the weight. It may be seen that the SAD is decreased as the weight is increased, that is, the similarity with the corresponding block is increased. On the contrary, it may be seen that the SAD is increased as the weight is decreased, that is, the similarity with the corresponding block is decreased.

As shown in FIG. 3B, it may be seen that the SAD is decreased in a quadratic curve form as the difference between the blocks is increased.

Meanwhile, a threshold value and a maximum value (max) in the graph of FIG. 3B are changed according to the SR set by the user, and this represents that the user sets predetermined ranges of the weight and SAD to remove the noise.

Thus, it is possible that only data about a current block which becomes a correction target block and the neighboring blocks is used in order to determine the block similarity.

This is because operations are performed under the assumption that the bad pixels were already corrected through the bad pixel correction unit 1.

Accordingly, the above method had to be separately provided with the bad pixel correction unit 1 and the noise reduction unit 2, and operations of correcting the bad pixels reducing noise were separately performed.

When an amount of data that is processed in each functional unit (e.g., 1 and 2) is increased, the memory capacity required for each unit is increased. Thus, the size of the image sensor and the image processing device is also increased along with the cost of manufacturing.

Figure 4:
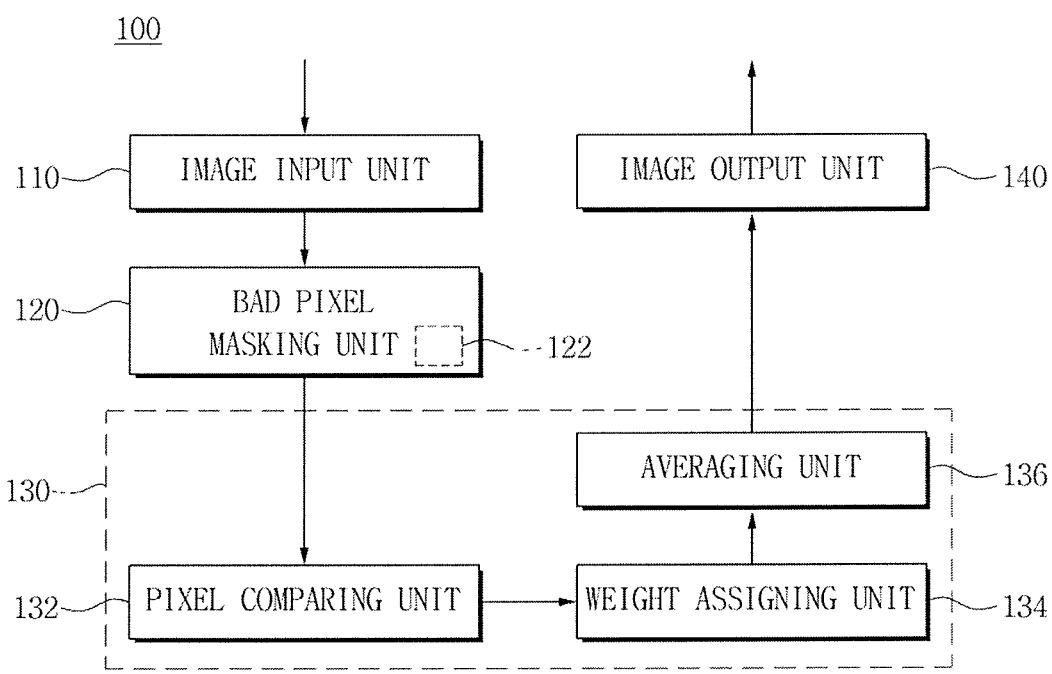
FIG. 4 is a block diagram of an image processing device according to an exemplary embodiment of the inventive concept.

FIG. 4 is a block diagram of an image processing device 100 according to an exemplary embodiment of the inventive concept.

Referring to FIG. 4, the image processing device 100 includes an image input unit 110 (e.g., an input device), a bad pixel masking unit 120, a noise reduction unit 130, and an image output unit 140 (e.g., an output device).

The image input unit 110 may receive images from a charge coupled device (CCD) or a CMOS Image Sensor (CIS), which includes a plurality of image sensor pixels which receives the images through a lens. The image input unit 110 receives pixel data, which may include color data of each pixel. The image input unit 110 may include the CCD or the CIS.

The bad pixel masking unit 120 according to an exemplary embodiment of the inventive concept determines locations of bad pixels and performs a masking operation while the bad pixels are determined. In an exemplary embodiment, the bad pixel masking unit 120 determines only the locations at which the bad pixels are generated, stores the locations as location data in a look up table 122, and adds an indexing to the location data of the corresponding pixel. Here, the indexing may be described as masking data.

The masking operation will be described with reference to Equation 1.

bad pixel mask$(i,j)$=indicator, when pixel $(i, j)$'s intensity is far from a pattern reference value in an amount of a certain threshold value.  [Equation 1]

The parameters i and j are X, Y coordinates, respectively. For example, an intensity of 80 or 220 of a given pixel is not within a threshold value of 50 of a pattern reference value of 150, and thus would be considered far enough from the pattern reference value to be masked out as a bad pixel. Please note that use of the threshold value of 50 and the pattern reference value of 150 are merely examples as these values may be changed to different amounts based on the application.

In an embodiment, the certain threshold value in Equation 1 is a parameter changeable by the user and the pattern reference value is an average value of the block pixel intensity (e.g., an average of the intensities of some or all the pixels in a block).

The bad pixel masking unit 120 calculates an average value of values (e.g., intensities) of some or all of remaining pixels excluding a pixel being tested (i.e., the pixel being tested to determine whether it is a bad pixel) to calculate an average value and compares a difference between the average value and a value (e.g., intensity) of the pixel being tested in order to determine whether the pixel is a bad pixel or not. For example, the bad pixel masking unit 120 may generate a range with a lower value corresponding to the average value minus the threshold value and an upper value corresponding to the average value plus the threshold value. For example, the bad pixel masking unit 120 may determine the pixel being tested to be a non-defective pixel when a data value (e.g., intensity) of the tested pixel is outside the range. In this case, the bad pixel masking unit 120 masks the tested pixel when the tested pixel is determined as a bad pixel. The masking of the tested pixel may include indexing the tested pixel as '1' or '0' and then storing this information in the look up table 122. For example, when the tested pixel is determined as a bad pixel, the bad pixel masking unit 120 may index it as '1'.

The bad pixel masking unit 120 may include the look up table 122 to store the data.

The look up table 122 may be any one of a programmable read only memory (PROM), an erasable PROM (EPROM), an electrically erasable PROM (EEPROM), and a static random access memory (SRAM), or any one selected memory equivalent.

For convenience of description, the look up table 122 is shown as being included in the bad pixel masking unit 120. However, embodiments of the inventive concept are not limited thereto. In an exemplary embodiment, the look up table 122 is included in a separate memory region and data from the bad pixel masking unit 120 is stored in the separate memory region.

Also, a pattern size, that is, a block size for determining the bad pixels may be adjusted to various values.

Further, when a pattern matching method is performed to determine the bad pixels, blocks may be overlapped or non-overlapped for comparison. This may be changed according to the user's intention.

In an embodiment, the noise reduction unit 130 removes the noise of the image in consideration of the bad pixels. The noise reduction unit 130 according to an embodiment of the inventive concept performs the NL means method on remaining pixels excluding the masked bad pixels in response to a determination result of the bad pixel masking unit 120.

The noise reduction unit 130 includes a pixel comparing unit 132, a weight assigning unit 134, and an averaging unit 136.

In an embodiment, the bad pixel masking unit 120 is implemented by a first processor, a first circuit, or a first microprocessor and the noise reduction unit 130 is implemented by a second processor, a second circuit, or a second microprocessor. In an embodiment, the pixel comparing unit 132, the weight assigning unit 134, or the averaging unit 136 is implemented by a processor. In an embodiment, the pixel comparing unit 132 is implemented by a comparator.

The pixel comparing unit 132 groups predetermined pixels to set or select a block for a comparison. In an exemplary embodiment, the pixel comparing unit 132 compares the similarity only with respect to remaining pixels excluding the bad pixels masked by the bad pixel masking unit 120.

An example in which a SAD value is used as the difference between blocks will be described.

A process of comparing the similarity may be represented as an algorithm in Equation 2.

block similarity$(i)$=SAD(current block, neighbor block$(i)$,bad pixel mask)  [Equation 2]

A difference between a current block, that is, a correction target block and a comparison target block is a value which represents a difference between a pixel value (e.g., an intensity) of one or more pixels included in the correction target block and a pixel value of one or more pixels included in the comparison target block. That is, the correction target block and the comparison target block may be more similar to each other as the difference between the correction target block and the comparison target block is smaller. The difference between the correction target block and the comparison target block may be obtained in various methods. However, these methods are the same in that the difference is obtained based on the difference between the values of the pixels included in the correction target block and the values of the pixels included in the comparison target block. For example, in the case of a block of 4×4 pixels, similarity between the blocks may be obtained based on an SAD which is a value in which absolute values of the differences between the pixels in each block for each corresponding position are summed.

In an embodiment of the inventive concept, in contrast to conventional methods, when a similarity between the current selected block and the neighboring blocks (i.e., the comparing blocks) is compared, masked pixels are considered.

When masked pixels are present in the corresponding block, the masked pixels are excluded from the comparing pixels. Therefore, when the corresponding block is a block of 4×4 pixels and has two masked pixels, the number of pixels used in the similarity comparison is 14, excluding the masked pixels. Thus, whether the masked pixels are bad or not does not directly affect the noise reduction.

In an exemplary embodiment, the weight assigning unit 134 assigns a weight to the block according to a result provided by the pixel comparing unit 132 indicating how similar the block is. The more similar the block, the higher the weight assigned. Also, the weight assigning unit 134 may exclude the masked pixels.

Equation 3 represents an algorithm of a weight assignment.

weight$(i)$=weighting function(block similarity$(i)$)  [Equation 3]

As shown in Equation 3, the weight assigning unit 134 may assign the weight based on the similarity using the weight assignment algorithm. For example, the weighting function can receive the similarity of a block relative to another block as a parameter, and then calculate the weight based on the similarity. In an embodiment, the higher the similarity, the higher the weight.

Then, the averaging unit 136 averages the comparison target blocks.

The averaging unit 136 obtains a correction value in which the assigned weight is multiplied by a pixel value of the pixel at the corresponding position using an algorithm such as Equation 4 before the averaging.

Meanwhile, the 'pixel value' used in the embodiments of the inventive concept may refer to data which represents a color of each pixel. For example, the color of each pixel may be represented in a (R, G, B) format, and the pixel value may be a sum of a value of R channel, a value of G channel, and a value of B channel. However, the pixel value need not be represented by one piece of numerical data and may instead be represented by a plurality of pieces of numerical data in a set.

$$\text{denoised pixel intensity in current pattern} = \text{sum}(\text{weight}(i)*\text{pattern representative pixel intensity}(i)) \quad [\text{Equation 4}]$$

The parameter i is a pattern position.

That is, referring to Equation 4, all values in which the pixel value for each pixel is multiplied by the weight are summed.

Then, the values are averaged using the number of the pixels used in the pixel comparison, and thus the noise of the corresponding block may be compensated. In this case, the averaged value may be assigned to a center pixel or to all pixels of the block. Although there is an accuracy difference, the selection may be made according to the user's intention in consideration of an amount of the operation data.

Therefore, the image output unit 140 may output the pixel values processed in such a way to provide a compensated image.

Figure 5:
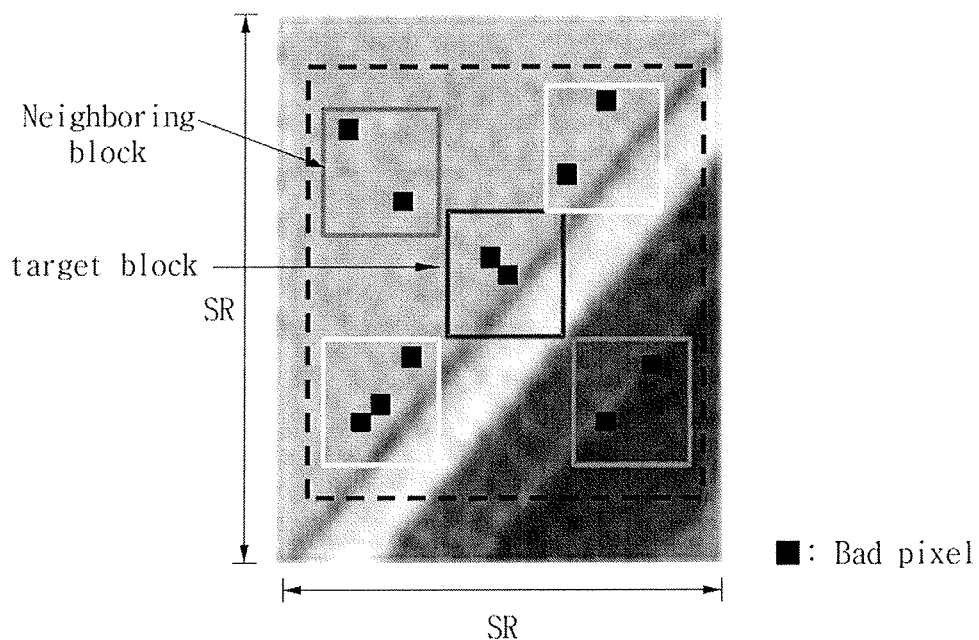
FIG. 5 is a view showing an example in which bad pixels are generated in blocks.

FIG. 5 is a view showing an example in which a plurality of blocks included in the SR are set and bad pixels are generated in the blocks.

Referring to FIG. 5, those pixels marked with black represent the bad pixels. When there is a noise reduction target block, a pattern matching method may be performed with comparison target blocks (neighboring blocks). In the noise reduction process, the black pixels which are the bad pixels are excluded from the comparison target block and a weight is also not assigned. However, when an average value of the corresponding block is finally obtained, the noise is reduced and thus the correction may be simultaneously performed on the bad pixels without any additional correction of the bad pixels.

Figure 6:
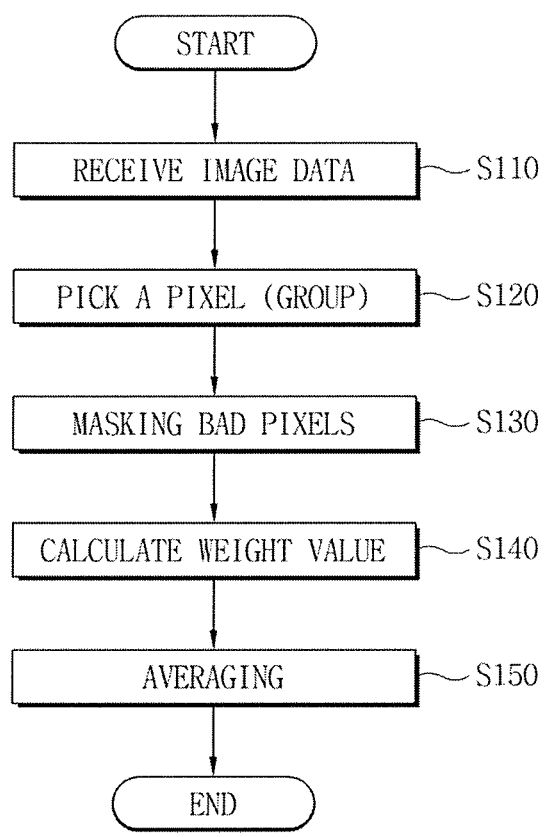
FIG. 6 is a flowchart of the image processing device according an exemplary embodiment of the inventive concept.

FIG. 6 is a flowchart of the image processing device 100 according to an exemplary embodiment of the inventive concept.

Referring to FIGS. 4, 5, and 6, the image processing device 100 receives images or image data (S110).

A group of a predetermined number of pixels is selected from the image processing device to select a pixel group (e.g., a pixel block) (S120).

The pixel group is selected regardless of whether bad pixels are present or not in the pixel group. When bad pixels are present, the corresponding bad pixels are masked (S130).

The pixel comparing unit 132 of the noise reduction unit 130 compares a similarity between only remaining pixels excluding the masked pixels included in the pixel group and those included in a neighboring block. Then, the weight assigning unit 134 assigns a weight based on a value of the similarity (S140).

The averaging unit 136 of the noise reduction unit 130 sums up all values, in which the pixel value for each pixel is multiplied by the weight, to average the summed values (S150).

The averaged value is assigned to the corresponding block, that is, the current block, and thus a result in which the bad pixels are corrected may be obtained without any operation for correcting the bad pixels.

Therefore, the noise reduction unit 130 may correct the bad pixels in consideration of the masked pixels while the noise reduction operation is performed.

Figure 7:
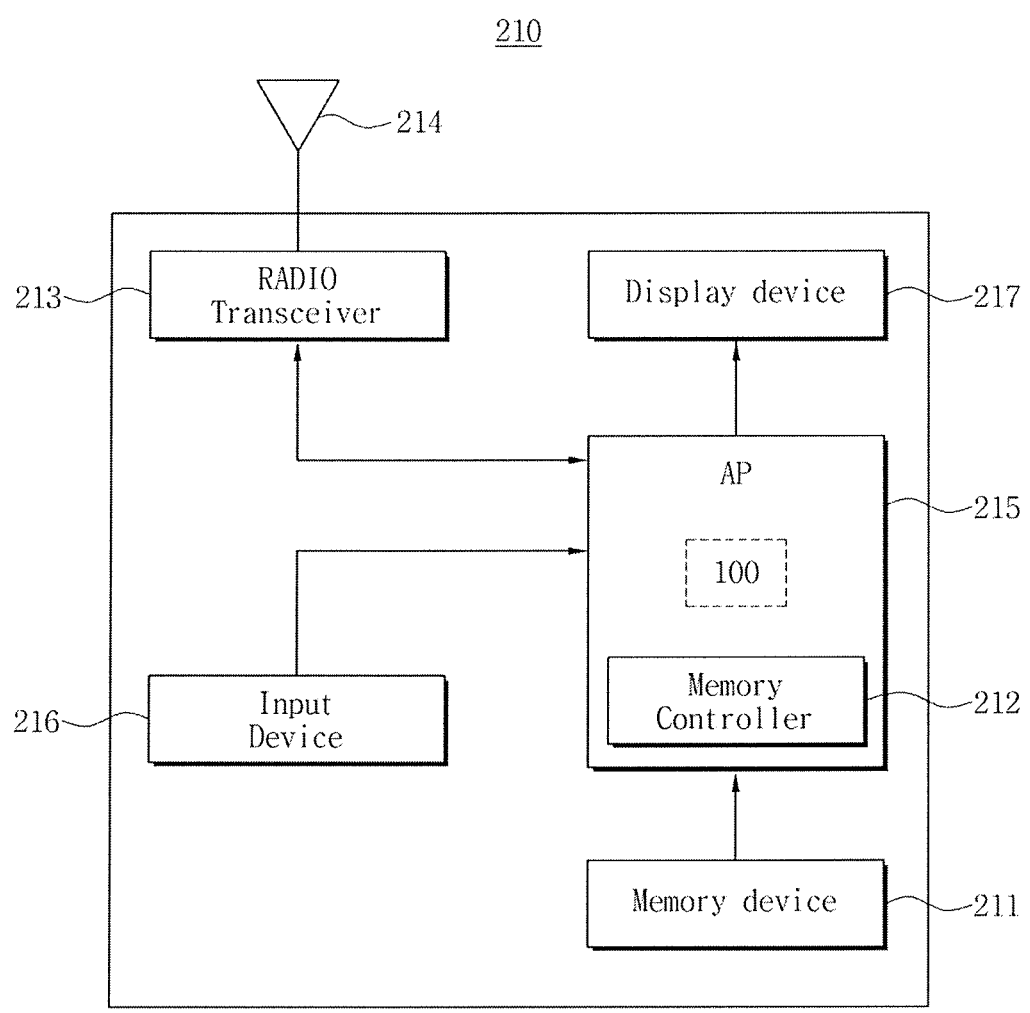
FIG. 7 is a block diagram of a computer system including the image processing device for correcting bad pixels and removing noise shown in FIG. 4 according to an exemplary embodiment of the inventive concept.

FIG. 7 is a block diagram of a computer system 210 including the image processing device 100 for correcting bad pixels and removing noise shown in FIG. 4, according to an exemplary embodiment of the inventive concept.

Referring to FIG. 7, the computer system 210 includes a memory device 211, a memory controller 212 which controls the memory device 211, a radio transceiver 213, an antenna 214, an application processor (AP) 215, an input device 216, and a display device 217.

The radio transceiver 213 may transmit or receive radio signals through the antenna 214. For example, the radio transceiver 213 may convert a radio signal received through the antenna 214 into a signal which may be processed in the AP 215.

Therefore, the AP 215 may process a signal output from the radio transceiver 213 and transmit a processed signal to the display device 217. Further, the radio transceiver 213 may convert a signal output from the AP 215 into a radio signal and output the converted radio signal to an external device through the antenna 214. According to an embodiment, the AP 215 includes the image processing device 100 shown in FIG. 4 according to an exemplary embodiment of the inventive concept.

The input device 216, which is a device in which a control signal for controlling an operation of the AP 215, or data to be processed by the AP 215 may be input, may be implemented as a pointing device, such as a touch pad or a computer mouse, a keypad, or a keyboard.

According to an embodiment, the memory controller 212, which may control an operation of the memory device 211, may be implemented as a part of the AP 215, or as a chip separated from the AP 215.

Figure 8:
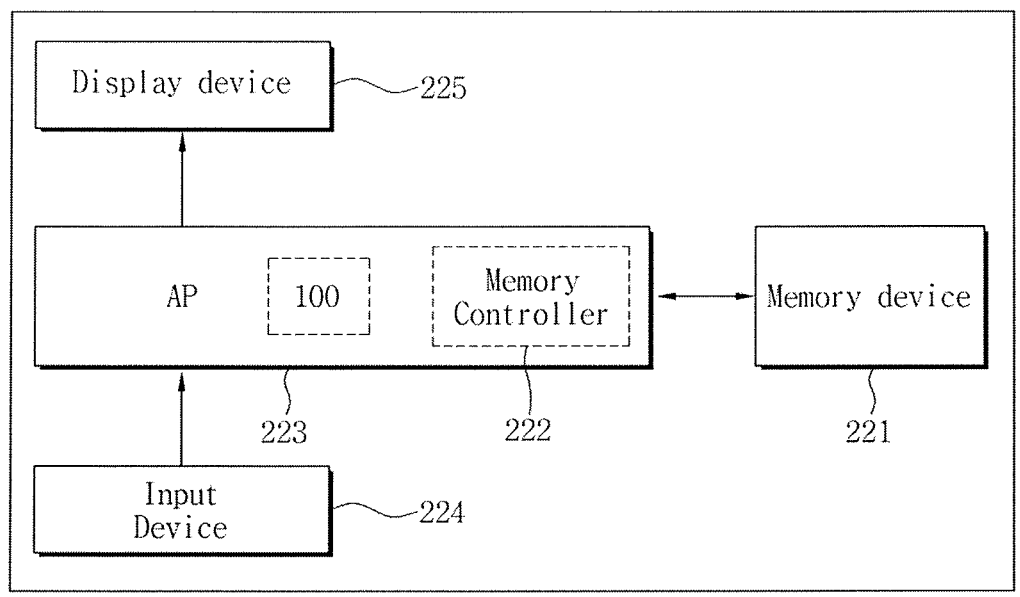
FIG. 8 is a block diagram of a computer system including the image processing device for correcting bad pixels and removing noise shown in FIG. 4 according to an exemplary embodiment of the inventive concept.

FIG. 8 is a block diagram of a computer system 220 including the image processing device 100 for correcting bad pixels and removing noise shown in FIG. 4 according to an exemplary embodiment of the inventive concept.

Referring to FIG. 8, the computer system 220 may be implemented as a personal computer (PC), a network server, a tablet PC, a net-book, an e-reader, a personal digital assistant (PDA), a portable multimedia player (PMP), a MP3 player, or a MP4 player.

The computer system 220 includes a memory device 221, a memory controller 222 which controls a data processing operation of the memory device 221, an AP 223, an input device 224, and a display device 225.

The AP 223 may display data stored in the memory device 221 through the display device 225 according to data input through the input device 224. For example, the input device 224 may be implemented as a pointing device, such as a touch pad or a computer mouse, a keypad, or a keyboard. The AP 223 may control overall operations of the computer system 220 and an operation of the memory controller 222.

According to the embodiment, the AP 223 includes the image processing device 100 shown in FIG. 4.

According to the embodiment, the memory controller 222, which controls an operation of the memory device 221, may be implemented as a part of the AP 223, or as a chip separated from the AP 223.

Figure 9:
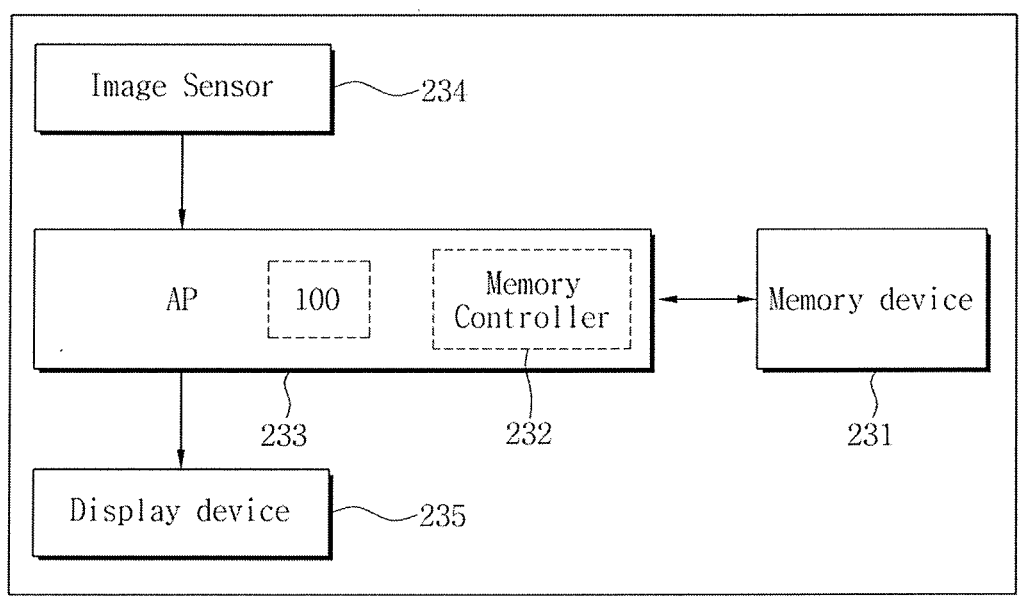
FIG. 9 is a block diagram of a computer system including the image processing device for correcting bad pixels and removing noise shown in FIG. 4 according to an exemplary embodiment of the inventive concept.

FIG. 9 is a block diagram of a computer system 230 including the image processing device 100 for correcting bad pixels and removing noise shown in FIG. 4 according to an exemplary embodiment of the inventive concept.

Referring to FIG. 9, the computer system 230 may be implemented as an image processing device, for example, a digital camera, or a mobile phone, a smart phone, or a tablet, in which the digital camera is mounted.

The computer system 230 includes a memory device 231, a memory controller 232 which controls a data process operation, for example, a write operation or a read operation of the memory device 231. The computer system 230 further includes an AP 233, an image sensor 234, and a display device 235.

The image sensor 234 of the computer system 230 converts an optical image to digital signals and the converted digital signals are transmitted to the AP 233 or the memory controller 232. The converted digital signals may be displayed on the display device 235, or may be stored in the memory device 231 through the memory controller 232, according to a control of the AP 233.

According to an embodiment, the AP 233 includes the image processing device 100 shown in FIG. 4.

Further, data stored in the memory device 231 is displayed on the display device 235 according to a control of the AP 233 or the memory controller 232.

According to the embodiment, the memory controller 232, which controls an operation of the memory device 231, may be implemented as a part of the AP 233, or as a chip separated from the AP 233.

Figure 10:
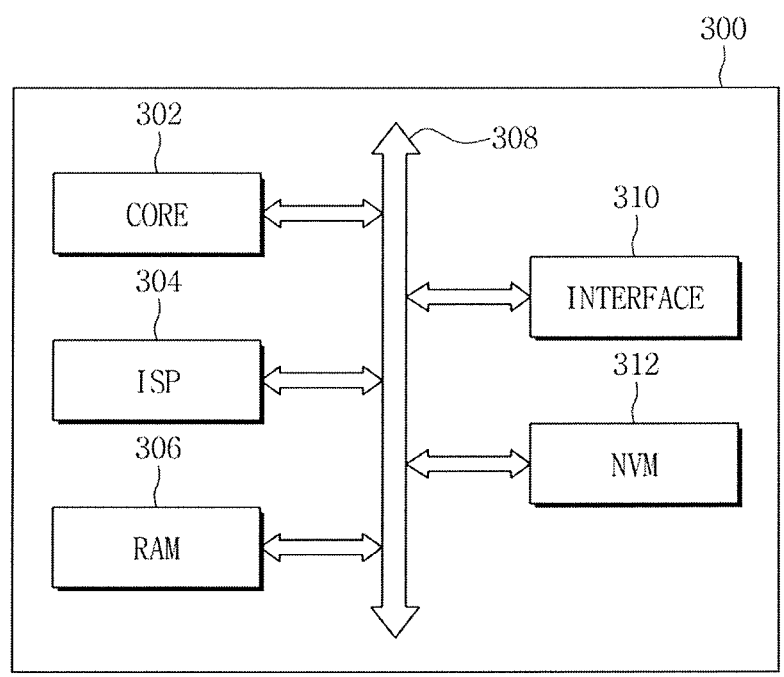
FIG. 10 is a block diagram of a noise reduction system according to an exemplary embodiment of the inventive concept.

FIG. 10 is a block diagram of a noise reduction system according to an exemplary embodiment of the inventive concept. As shown in FIG. 10, a noise reduction system 300 according to the embodiment of the inventive concept includes an interface 310, an image signal processor (ISP) 304, and a core 302 and may further include a RAM 306, a non-volatile memory 312, and an internal data path 308 (e.g., an internal data bus).

The interface 310 is connected to an external device (not shown) to receive pixel data including color data of each pixel included in a correction target image from the external device and transmits the pixel data to the ISP 304.

The external device, which is a device connected to a noise reduction system according to the embodiment of the inventive concept, is not limited to a device having a certain function. For example, the external device may be a storage device or an image sensor.

The ISP 304 removes noise from the pixels included in the pixel data using an SAD method. The bad pixels may be corrected while the noise reduction is performed, by considering the bad pixels while the noise is removed. For example, the ISP 304 may perform the functions that are performed by the image processing device 100.

The core 302 performs an instruction set stored in the RAM 306. The core 302 may control the interface 310 and the ISP 304 by performing the instruction set.

The core 302 may receive at least one of the threshold values, the number of corrections, and the correction weight from the external device connected to the interface 310 by performing the instruction set stored in the RAM 306. The core 302 may store the data received from the external device in the non-volatile memory 312 by performing the instruction set stored in the RAM 306.

The ISP 304 may load at least one of the threshold values, the number of corrections, and the correction weight stored in the RAM 306 to use for the noise reduction.

The noise reduction system 300 according to the embodiment of the inventive concept may be configured as an AP.

The image processing device according to the embodiment of the inventive concept determines the bad pixels, provides position data and masking data about the bad pixels, and masks the bad pixels while a pattern matching operation for removing noise is performed. Therefore, the bad pixels can be effectively corrected while the noise reduction is performed and thus operation time of data and the number of operations can be reduced.

The embodiments of the inventive concept can be applied to an image processing device, and specifically, an image signal processing system.

An embodiment of the inventive concept provides an image processing device that is capable of removing noise from image data without considering the parts of the image data that was contributed from bad pixels among pixels used to generate the image data.

While exemplary embodiments of the inventive concept have been described in detail, it should be understood that various changes, substitutions and alterations may be made herein without departing from the scope of the inventive concept.

What is claimed is:

1. An image processing device comprising:
   a first processor configured to detect bad pixels in a plurality of pixel blocks and mask the detected bad pixels, each pixel block including a plurality of pixels; and
   a second processor configured to execute a noise reduction operation to remove noise from the pixels in the plurality of blocks excluding the masked pixels using a pattern matching method and to correct the bad pixels by obtaining an average value of a current block excluding the masked pixels and assigning the average value to all the pixels of the current block including the masked pixels,
   wherein the second processor uses the pattern matching method to remove noise from the pixels in the plurality of blocks while the first processor detects and masks the bad pixels, and
   wherein the first processor determines whether one of the pixels in one of the blocks is a bad pixel when a pixel value of the one pixel differs from an average pixel value of at least one other pixel in the one block excluding the one pixel by more than a threshold.

2. The device of claim 1, wherein the first processor stores masking data for the one pixel when the one pixel is determined to be the bad pixel, the masking data including position data of the one pixel.

3. The device of claim 1, wherein the pattern matching method selects a correction target block and a comparison target block from the plurality of pixel blocks, and compares a similarity between the plurality of pixels included in the correction target block and the comparison target block, wherein the masked pixels are excluded from the comparison.

4. The device of claim 3, wherein the second processor sums up absolute values of differences between the plurality of pixels included in each of the correction target block and the comparison target block to generate a summed value and calculates a value of the similarity based on the summed value.

5. The device of claim 4, wherein the second processor assigns a weight according to the value of the similarity, wherein the masked pixels are excluded from the assignment of the weight.

6. The device of claim 5, wherein the second processor provides an average value of values as a compensation value of the correction target block, wherein the values are generated from multiplying a pixel value for each pixel of the comparison target block by the weight.

7. An application processor (AP) comprising:
an image processing device configured to perform a noise reduction operation on a plurality of pixels excluding the pixels determined to be bad pixels; and
a memory controller configured to control the image processing device, wherein the image processing device comprises:
a first processor configured to detect from input pixel values whether the pixels are bad pixels or not and mask the detected bad pixels; and
a second processor configured to receive masking data from the first processor indicating the masked pixels, compare a similarity with respect to blocks of the pixels excluding the masked pixels, and correct the masked pixels by performance of the noise reduction operation on a corresponding one of the blocks to generate compensated pixel values that are assigned to the corresponding one of the blocks of pixels including the masked pixels,
wherein the second processor performs the noise reduction operation while the first processor detects and masks the bad pixels, and
wherein the first processor detects whether one of the pixels in one of the blocks is a bad pixel when a pixel value of the one pixel is outside a range determined from a threshold and an average pixel value of at least one other pixel in the one block excluding the one pixel.

8. The application processor of claim 7, wherein the first processor stores position data of the bad pixels in the masking data.

9. The application processor of claim 7, wherein the second processor uses a pattern matching method as the noise reduction method.

10. The application processor of claim 9, wherein the second processor is configured to select a first block and a second block among the blocks, and compare a similarity between the two blocks excluding pixels of the two blocks determined to be the bad pixels, wherein the second processor is configured to assign a weight to the second block according to a result of the compare, and wherein the second processor is configured to calculate an average value using the weight and a pixel value of each pixel of the second block.

11. The application processor of claim 10, wherein the second processor sums up absolute values of differences between the pixels included in each of the first block and the second block to generate a summed value and calculates a value of the similarity based on the summed value.

12. The application processor of claim 10, wherein during the assignment of the weight to the second pixel block, the weight is assigned to all the pixels of the second block except the bad pixels.

13. An image processing device comprising:
a digital image sensor comprising a plurality of pixels;
an application processor configured to detect bad pixels within a first pixel block comprising a first set of the pixels and a second pixel block comprising a second set of the pixels, compare pixel values of the, pixels of the first pixel block not detected to be bad pixels with pixel values of the pixels of the second pixel block not detected to be bad pixels to generate a similarity metric, correct the bad pixels included in the first pixel block by execution of a noise reduction operation on the pixel values of the first pixel block using the similarity metric that assigns a value to the pixels of the first pixel block including the bad pixels,
wherein the application processor determines whether one of the pixels in one of the pixel blocks is a bad pixel when a pixel value of said one of the pixels differs from an average pixel value of at least one other pixel in said one of the pixel blocks by more than a threshold.

14. The image processing device of claim 13, wherein the application processor sums up absolute values of differences between the pixels values of the pixels included in each of the first pixel block and the second pixel block to generate the similarity metric.

15. The image processing device of claim 14, wherein the application processor assigns a weight according to the similarity metric, wherein the bad pixels are excluded from being assigned the weight.

16. The image processing device of claim 15, wherein the application processor generates an average value of values as a compensation value of the first pixel block, wherein the values are generated from multiplying a pixel value for each pixel of second block by the weight.

* * * * *